Figure 1:
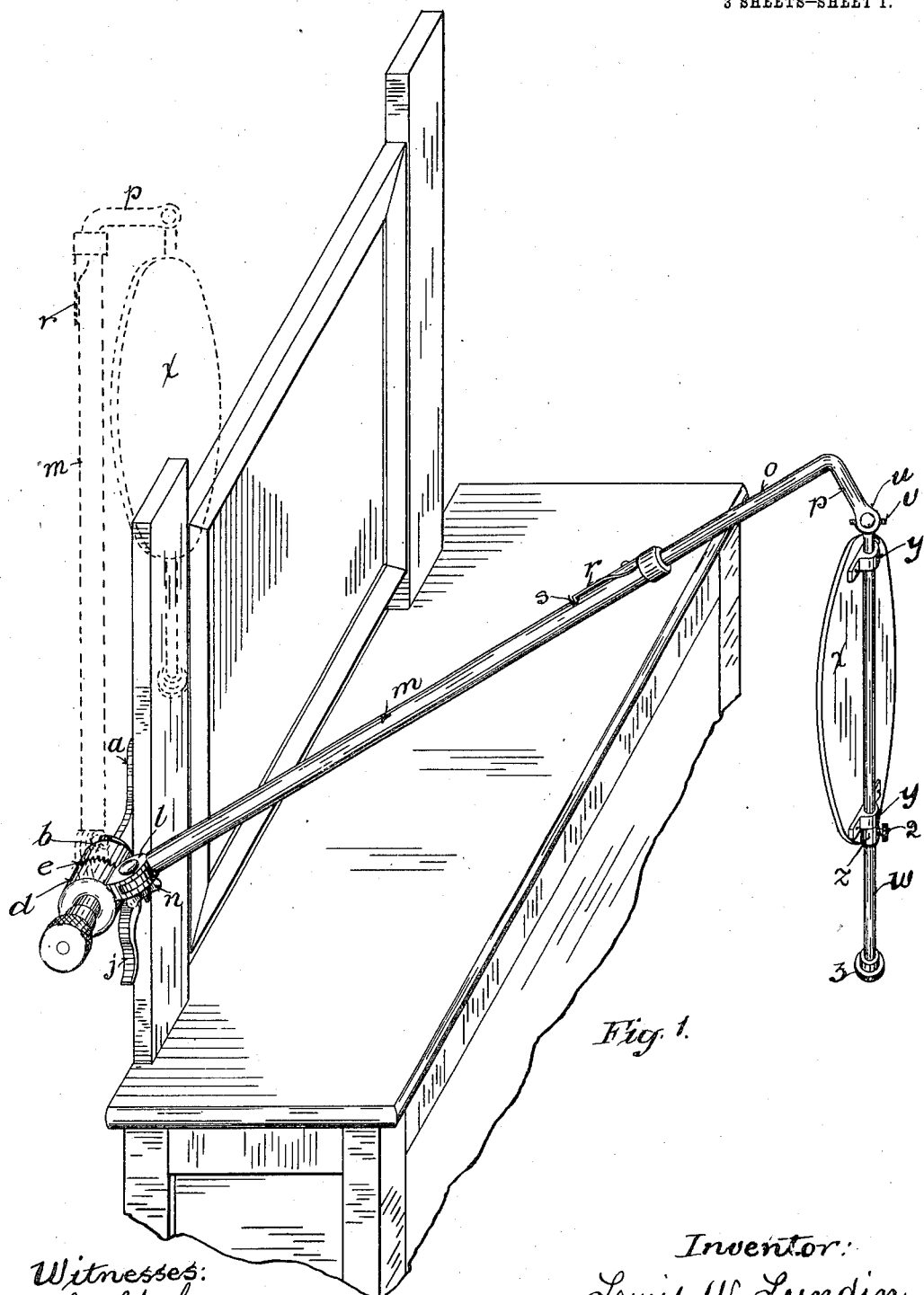

L. W. LUNDIN.
ADJUSTABLE BRACKET FOR MIRRORS.
APPLICATION FILED JULY 24, 1909.

1,031,075.

Patented July 2, 1912.

3 SHEETS—SHEET 1.

Witnesses:
John Spark
Cecil Long

Inventor:
Lewis W. Lundin
by F. J. Geisler
Atty.

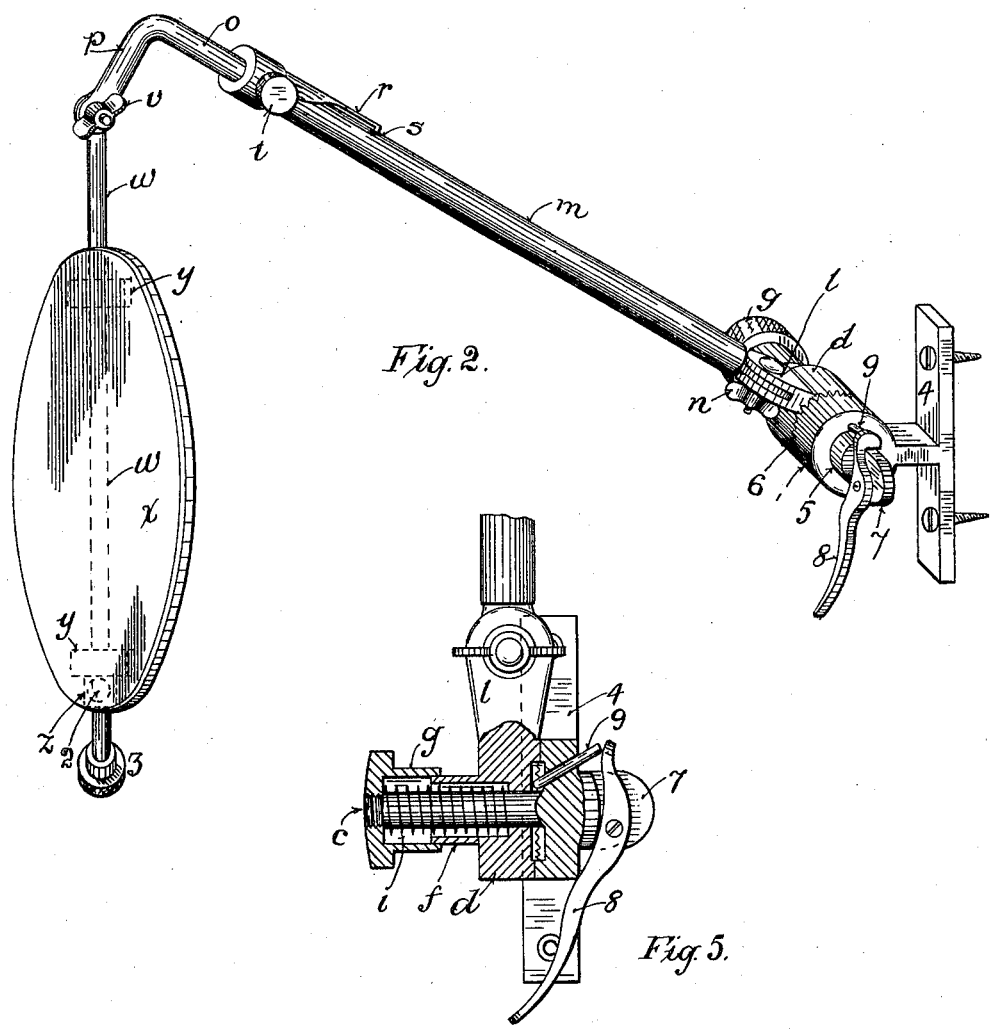

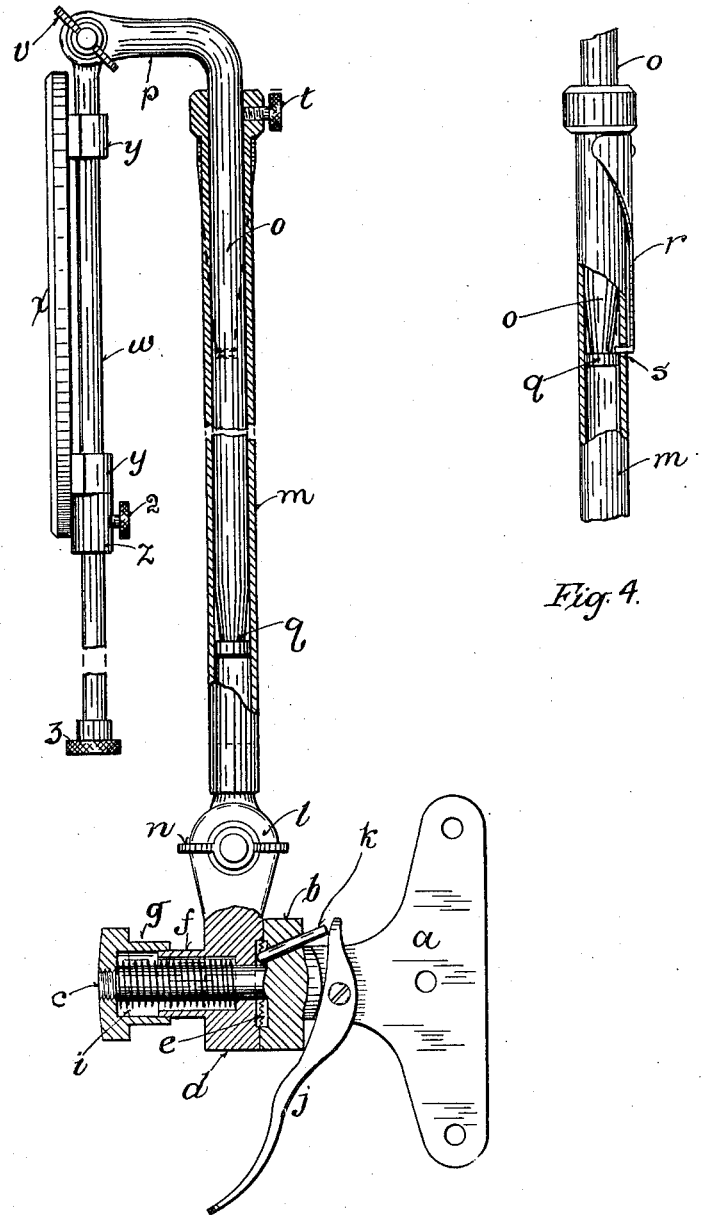

UNITED STATES PATENT OFFICE.

LEWIS W. LUNDIN, OF PORTLAND, OREGON.

ADJUSTABLE BRACKET FOR MIRRORS.

1,031,075.  Specification of Letters Patent.  Patented July 2, 1912.

Application filed July 24, 1909. Serial No. 509,466.

*To all whom it may concern:*

Be it known that I, LEWIS WALFRED LUNDIN, a citizen of the United States, and a resident of Portland, in the county of Multnomah and State of Oregon, have invented a new and useful Improvement in Adjustable Brackets for Mirrors, &c., of which the following is a specification, reference being had to the accompanying drawings as constituting a part thereof.

This invention has for its object to obtain a mirror supporter which is adapted to be attached to a dresser, dressing table, or like piece of furniture, or to the wall of a room, by means rendering the mirror adjustable to any convenient position. Also to render the device simple in its manufacture and use.

I obtain my object by the device which includes the features, combinations and arrangement of parts hereinafter fully described.

In the drawings: Figure 1 shows, perspectively, a dresser with my supporter attached thereto, as in practice; Fig. 2 shows my supporter detached; Fig. 3 is a sectional view of my device as a whole, illustrating its component parts; Fig. 4 is a sectional detail of construction, fully described in the body of the specification; and Fig. 5 is a sectional detail of construction showing a different type of supporting bracket.

That part of my device by which the same is attached to its support may be constructed as illustrated in Figs. 1 and 3, or as shown in Figs. 2 and 5.

Referring in the first instance to Figs. 1 and 3: the bracket, $a$, is made with a hinge-joint comprising an integral annular head $b$, and an integral stud-pin $c$, threaded at its extremity. On the pin $c$ is an annular piece $d$, being a companion member to the head $b$. Both of said members, $b$, $d$, are made with serrated meeting faces $e$, so that they can be interlocked in any relatively radial position as convenient. The member $d$ is made with a tubular neck, on which is mounted a sleeve-cap $g$, such cap being secured on the threaded end of the pin $c$. Located within the neck $f$, on the pin $c$, and bearing against the interior of the cap $g$ is a coil-spring $i$, of such tension as to be capable of normally holding the meeting faces of the members $b$, $d$ in engagement with each other. On the bracket, $a$, is provided a lever $j$, bearing against a push-pin $k$, slidable in the member $b$, and the parts being so arranged that, by bearing on the lever $j$, the pin $k$ will be forced against the member $d$, and move the same out of engagement with the member $b$, which operation is required in order to change the relative radial engagement of the members $b$, $d$ with each other. The member $d$ is made with an integral lug $l$, to which is rotatably secured the eye of a tubular rod $m$, which is held in the position to which it is adjusted by means of a bolt and wing nut $n$. Within the tubular rod $m$ is a slidable and rotatable rod $o$, the outer extremity of which is made with a curved part $p$, and the inner end of said rod $o$ being made with a reduced diameter and projecting flange-head $q$, so that the outward movement of the rod $o$, in the tubular rod $m$, may be limited by a spring dog $r$, fastened to the outer end of the tubular rod $m$, and projected to the interior of the rod through an aperture $s$, as more clearly illustrated in Fig. 4. The outer end of the tubular rod $m$ is provided with a set screw $t$, so that the rod $o$ may be secured in the position to which it is adjusted in the tubular rod $m$. At the extremity of the bent part $p$ of the rod $o$ is provided an eye $u$ and a screw bolt and wing nut $v$, pendently and adjustably holding a rod $w$, on which is longitudinally movable a mirror $x$, provided on its back face with perforated lugs $y$, $y$. On the pendent rod $w$ is a movable collar $z$, provided with a set screw 2; and the lower end of the rod $w$ is provided with a screw-head 3, which is removable to permit the mirror $x$ being placed on or taken from the rod $w$. I provide an adjustable collar $z$ and set-screw therefor, instead of set-screw in one of the lugs $y$, $y$, so as to enable me to adjust the height of the mirror $x$ on the rod $w$, without interfering with the pivoting of the mirror on such rod.

The device shown in Fig. 2, as will have been noted, is in all respects the same as shown in Figs. 1 and 3, with this exception: the bracket $a$, shown in Figs. 1 and 3, is replaced by a bracket 4, adapted to be affixed to the wall of a room, such bracket 4 being provided with an integral member 5, corresponding to the member $b$ of the bracket $a$, and like the member $b$, being provided with a serrated face 6, so as to be adapted to constitute the companion member of the member $d$. The member 5 is provided with a projecting piece 7, on which is pivoted a lever 8, the equivalent of the lever $j$ above described. I also provide a reciprocable pin 9, being the equivalent of the reciprocable pin $k$, shown in Fig. 3, for example. In short, it will be seen that the brackets $a$ and 4 are interchangeable with each other, in connection with the remainder of my device.

The manner of practically using my device, as well as its utility, is self evident from the foregoing description.

I claim:

In a bracket the combination of a supporting plate formed with an integral hinge-member and having a centrally projecting hinge-pin; a companion hinge-member movably mounted on said hinge-pin; interlocking serrations on the opposed faces of said hinge-members; said rotatable hinge-member formed with a neck concentric with the hole for the pin and with a cavity at the base of such neck, the hinge-pin projecting beyond the latter; a nut threaded on the extremity of said hinge-pin, said nut formed with a sleeve sliding on the tubular neck of the rotatable hinge-member; a coil-spring seated within said tubular neck and the sleeve and adapted to hold the hinge-members in engagement; a push-pin reciprocable in and projecting from the rear face of the fixed hinge-member, and bearing against the movable hinge-member; a lever on the bracket for operating said push-pin.

LEWIS W. LUNDIN.

Witnesses:
CECIL LONG,
JOHN SPERB.